United States Patent [19]

Müller et al.

[11] Patent Number: 5,085,612

[45] Date of Patent: Feb. 4, 1992

[54] APPARATUS FOR TRANSPORTING SAUSAGES FILLED IN A CONTINUOUS SAUSAGE CASING

[75] Inventors: Gerhard Müller, Schemmerhofen; Albert Hermann, Biberach/Riss, both of Fed. Rep. of Germany

[73] Assignee: Albert Handtmann Maschinenfabrik Gmbh & Co., KG, Biberach/Riss, Fed. Rep. of Germany

[21] Appl. No.: 580,571

[22] Filed: Sep. 11, 1990

[30] Foreign Application Priority Data

Oct. 13, 1989 [DE] Fed. Rep. of Germany ... 8912219[U]

[51] Int. Cl.$^5$ ............................................. A22C 25/18
[52] U.S. Cl. .................................... 452/51; 452/183; 198/465.1
[58] Field of Search ................. 452/51, 182, 183, 184, 452/185, 186, 32, 34, 31; 198/465.1, 465.2, 465.4

[56] References Cited

U.S. PATENT DOCUMENTS

| 4,201,286 | 5/1980 | Meier | 198/465.4 |
| 4,218,003 | 8/1980 | Plewa et al. | 452/31 |
| 4,667,804 | 5/1987 | Dubuit et al. | 198/465.1 |
| 4,682,385 | 7/1987 | Nasai et al. | 452/51 |
| 4,761,854 | 8/1988 | Schnell et al. | 452/51 |
| 4,880,105 | 11/1989 | Kasai et al. | 452/51 |
| 4,947,978 | 8/1990 | Rhodes | 198/465.1 |

FOREIGN PATENT DOCUMENTS

| 0223993 | 10/1986 | European Pat. Off. |  |
| 0259920 | 3/1988 | European Pat. Off. |  |
| 2343427 | 3/1977 | France |  |
| 2530591 | 1/1984 | France |  |
| 2586010 | 2/1987 | France |  |
| 0011581 | 1/1977 | Japan | 198/465.1 |
| 0731942 | 5/1980 | U.S.S.R. | 452/183 |
| 8906632 | 1/1989 | World Int. Prop. O. |  |

Primary Examiner—James G. Smith
Assistant Examiner—Lawrence Cruz
Attorney, Agent, or Firm—Finnegan, Henderson, Farabow, Garrett & Dunner

[57] ABSTRACT

Apparatus for transporting sausages, which are filled in a continuous sausage casing, by suspending said sausages in the form of loops from reception hooks. The reception hooks are connected to an endless, driven conveyor belt in spaced relationship with one another, the conveyor belt circulating round two deflection wheels with the hooks being loaded with the sausage loops in the area of a first leg of the conveyor belt (transport leg) and returning without any load in the area of a second leg (free leg). To allow adjustment of the spacing between the hooks depending on the size and the nature of the chain of sausages, the hooks are positively connected to the conveyor belt in the transport leg and are frictionally connected to the conveyor belt in the free leg.

19 Claims, 5 Drawing Sheets

APPARATUS FOR TRANSPORTING SAUSAGES FILLED IN A CONTINUOUS SAUSAGE CASING

BACKGROUND OF THE INVENTION

The present invention refers to an apparatus for transporting sausages, which are filled in a continuous sausage casing, by suspending said sausages in the form of loops from reception hooks. The hooks are connected to an endless, driven conveyor belt in spaced relationship with one another, said conveyor belt circulating round two deflection wheels and said hooks being loaded with the sausage loops in the area of a first leg of the conveyor belt (transport leg) and returning without any load in the area of a second leg (free leg).

Such apparatuses are normally used for the purpose of preparing and suspending such sausages in the form of chains in such a way that they can be transferred to a smoking rod by means of which a sausage chain of adequate length can then be hung up in a smoking device.

In the case of a known apparatus of this type, the hooks are fixedly arranged on the conveyor belt, i.e. the spaces between the individual hooks cannot be varied. (German Offenlegungsschrift 26 10 315).

The present invention is based on the task of further developing an apparatus of this type in such a way that it is suitable for suspending and transporting the chain of sausages, which is formed by loops, such that—depending on the size and the nature of said chain of sausages—larger or smaller distances exist between the individual loops.

SUMMARY OF THE INVENTION

In order to solve this task, the present invention provides a sausage transporting apparatus in which the hooks are positively connected to the conveyor belt in the area of the transport leg and are frictionally connected to the conveyor belt in the area of the free leg.

More particularly, the sausage transporting apparatus comprises apparatus for transporting continuous sausage casing in the form of suspended loops comprising an endless conveyor belt circulating continuously around 2 deflection wheels, a first leg of travel of the belt between said wheels serving as a transport leg where the sausage loops are transported by the conveyor belt and a second leg of travel a free leg where the conveyor belt is free of the sausage loops, means for rotating at least one of said wheels to drive said belt, a plurality of reception hooks for holding the loops of casing, guide means for supporting and guiding said hooks for movement in a fixed endless path compatible with the path of travel of said conveyor belt, means for positively connecting said hooks to said belt in spaced relationship with one another for travel therewith through said transport leg and means for disengaging said positive connection at the end of the transport leg and for frictionally connecting said hooks to the conveyor belt for travel therewith through said free leg.

With this arrangement, it is possible to vary the distances between the individual hooks in the area of the free leg with the aid of simple means, if, for example, a different type of sausage is produced in the case of which larger or smaller distances between the loops are advantageous. In view of the frictional connection to the conveyor belt, the hooks can be displaced in the area of the free leg such that the respectively most advantageous distances are obtained. However, as long as only one specific type of sausage is produced, the distances between the individual hooks will remain unchanged.

BRIEF DESCRIPTION OF THE DRAWINGS

Additional features and advantages of the present invention will be evident from the description following hereinbelow in connection with the drawings in which embodiments of the present invention are schematically shown.

In said drawings.

DETAILED DESCRIPTION OF THE INVENTION

Figure 1:
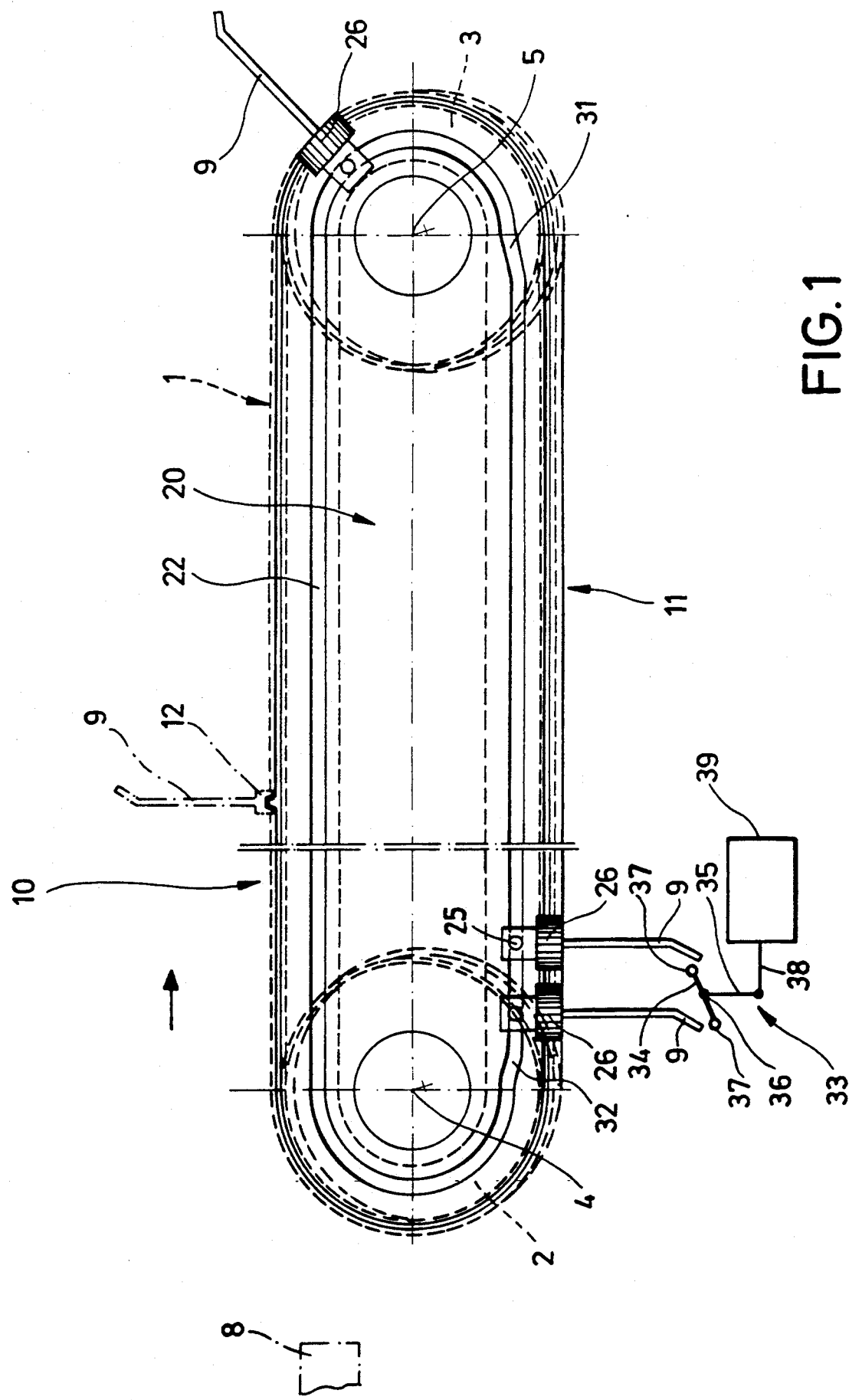
FIG. 1 shows a schematic representation of a top view of the apparatus.
Figure 3:
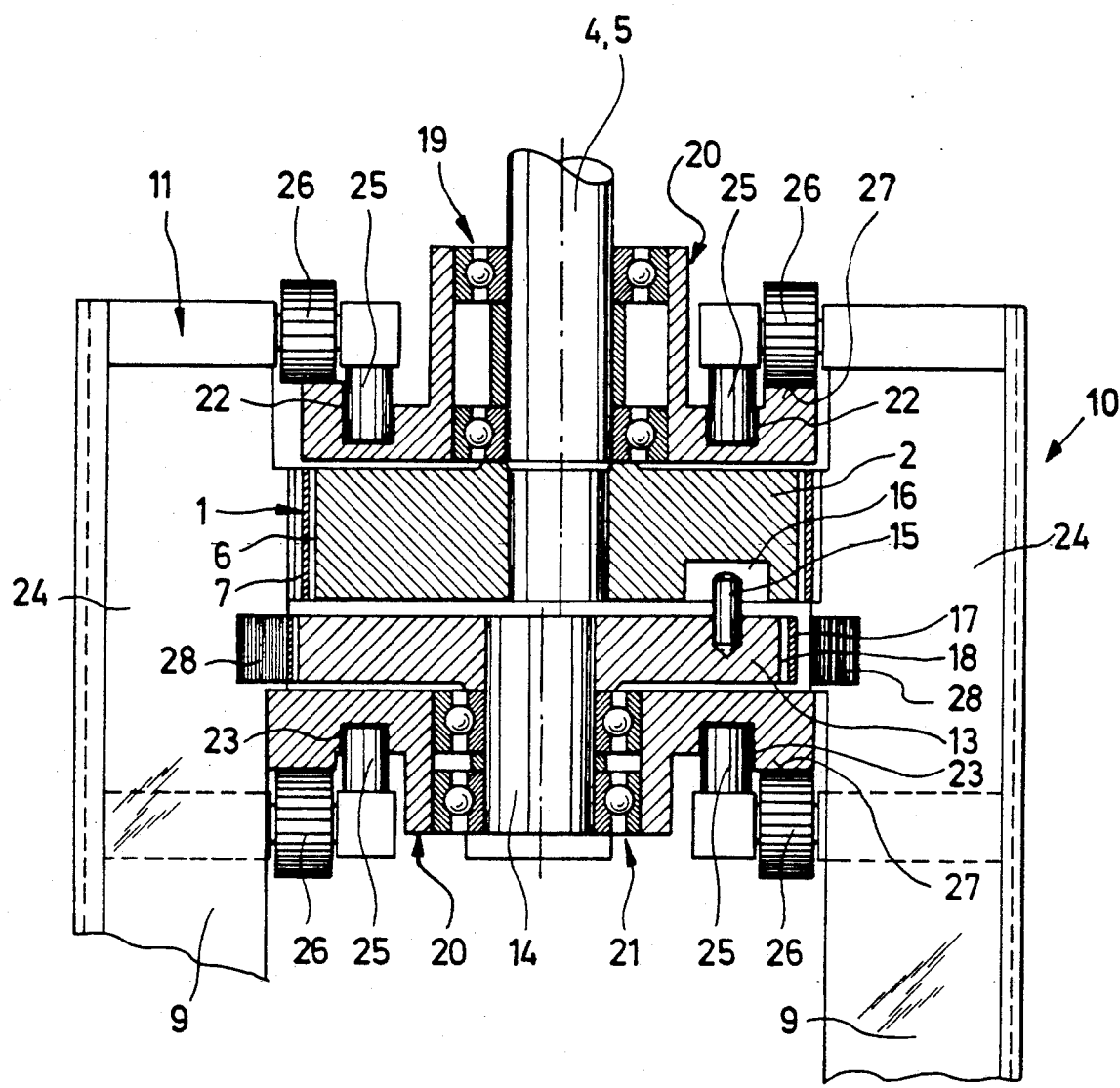
FIG. 3 shows a cross-section through a deflection gear on the left in FIG. 1.

As can be seen from FIGS. 1 and 3, the apparatus is provided with an endless conveyor belt 1 guided around deflection wheels 2 and 3, which, in the embodiment shown, and rotatably supported by means of upright shafts 4 and 5.

The conveyor belt is constructed as a toothed belt having internal teeth 6 on one side and outwardly projecting protrusions or external teeth 7 on the other (FIG. 3). The transport belt 1 engages with its internal teeth 6 the deflection wheels 2 and 3, which are constructed as gears. Thus rotation of shafts 4 and/or 5 by a suitable drive and control means drives conveyor belt 1.

In FIG. 1, a filling tube 8 is outlined on the left hand side by a dot-and-dash line, the sausages being discharged from said filling tube 8. Said sausages—which are suspended in the form of loops—are transported by hooks 9 in the direction of the arrow in the area of a transport leg 10 of the conveyor belt 1. The sausage loops, which are suspended from the hooks 9 in the area of the transport leg, are transferred to a smoking rod (not shown) and detached by means of said rod so that, after having been deflected around by the deflection wheel 3, the fill hooks reach the leg 11 of the conveyor belt.

On the side facing the conveyor belt 1, each hook is provided with coupling teeth 12 (FIG. 2) by means of which each hook engages the external teeth 7 of the conveyor belt 1 on the side of the transport leg 10 and is thus positively connected to said conveyor belt.

As can be seen from FIG. 3, a disc 13 is located below the deflection gear 2, said disc being secured to an upright shaft 14, which, relative to the shaft 4, is slightly displaced to the side in the direction of the free leg 11 and which is rotatably supported. A driving pin 15 projects beyond the upper side of the disc 13, said driving pin 15 engaging a recess 16 of in the deflection gear 2 with a certain amount of radial play so that the disc 13 is rotated and belt 17 is driven by rotary movement of the deflection gear 2.

Such a disc 13 is also arranged below the deflection wheel 3 in the same manner, said two discs 13 serving as carrier means for an endless, smooth conveyor belt 17. A steel strip 18 is arranged between the disc 13 and the conveyor belt 17; the conveyor belt 17 may consist of rubber and it may be vulcanized on the steel strip 18. The deflection wheels 2 and 3 and the discs 13 may be made from plastic material.

The main shafts 4 and 5 of the deflection wheels 2 and 3 are supported in a stationary guide body 20 by means of ball bearings 19. Also the secondary shafts 14 are rotatably supported in said guide body 20 by means of the ball bearings 21. The guide body 20, which can consist of plastic material as well, is provided at the upper side thereof with an upper endless guide groove 22 and at the lower side thereof with an endless lower guide groove 23, which is in alignment with said upper guide groove 22. Each hook 9 is equipped with a coupling member 24, which has secured thereto two oppositely disposed guide pins 25 engaging the upper guide groove 22 and the lower guide groove 23 that each hook is forcibly guided in the guide body 20 while moving on its circulation path.

A traveling wheel 26 is supported on the upper and lower sides of coupling member 24 of each hook 9 beside each guide pin 25.

These travelling wheels 26 run on smooth tracks 27, which are provided on the guide body 20 beside the guide grooves 22 and 23.

Hence, the hooks are secured against any lateral movement and they transmit the weight of the transported chain of sausages to the guide body 20.

The coupling member 24 of each hook 9 has secured thereto a permanent magnet 28, which faces the smooth conveyor belt 17.

In the area of the transport leg 10, the coupling member 24 of each hook 9 is pressed into the external teeth 7 of the conveyor belt 1 via its coupling teeth 12, i.e. each hook 9 is positively connected to the conveyor belt 1 in the area of the transport leg 10.

Figure 2:
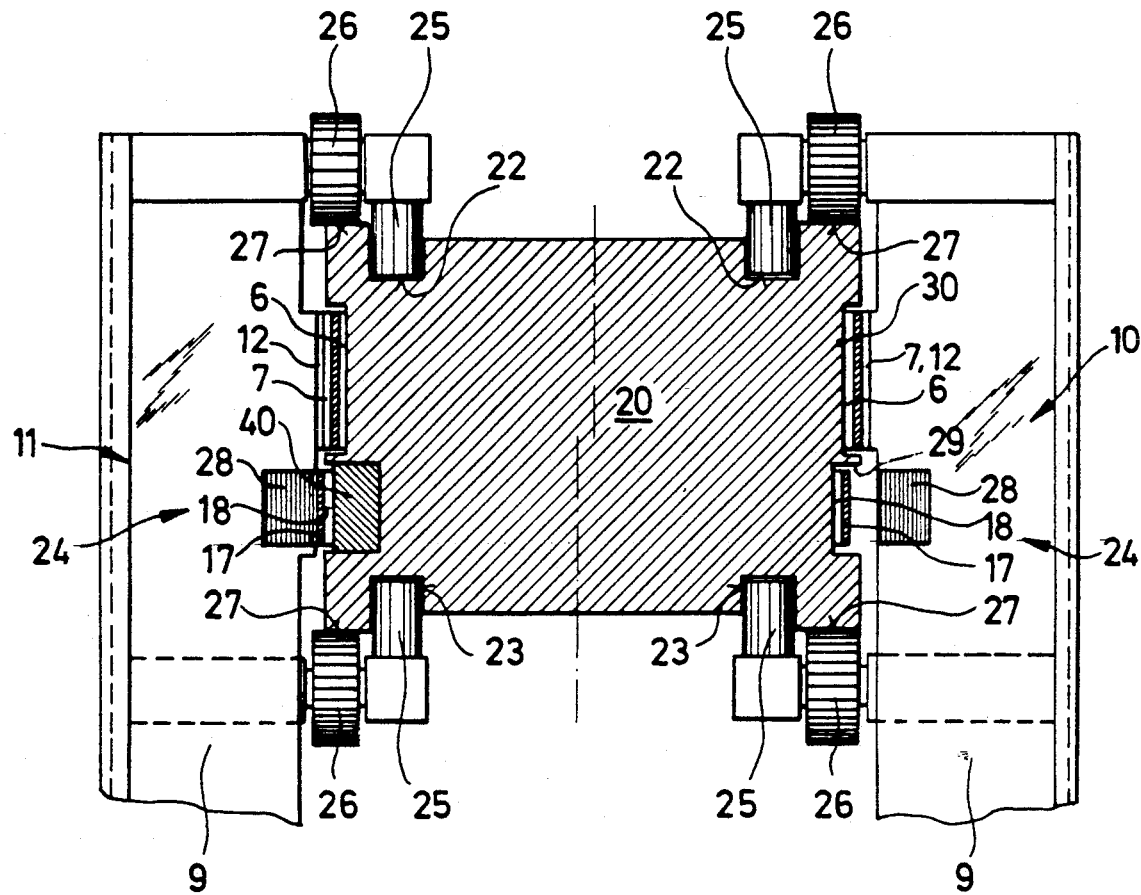
FIG. 2 shows a cross-section of the apparatus between the two deflection wheels looking toward the left of FIG. 1.

The smooth conveyor belt 17 is guided in a support groove 29 provided in the guide body 20, whereas the toothed conveyor belt 1 is supported in a groove 30 provided in said guide body (FIG. 2). These support grooves support the positive-engagement belt and the frictional engagement belt so that engagement between the belts and the hooks is guaranteed, particularly in the case of long belts.

As shown in FIG. 1 in the area of reversal of the conveyor belt 1 around wheel 3, guide groove 22 as well as guide groove 23 extends outwards in a disengagement curve 31 on side of the free leg 11 so that, subsequent to said curve, the guide grooves 22 and 23 are displaced laterally outwards relative to a plane extending through the center of shafts 4 and 5. At the end of the free leg 11, the guide grooves 22 and 23 return to a circular path in an engagement curve 32.

The magnet 28 on the coupling member 24 of each hook is brought into contact with the smooth conveyor belt 17 on the side of the free leg so that a non-positive engagement (frictional engagement) is thus established between each hook 9 and the smooth conveyor belt 17, whereas the coupling teeth 12 of each hook are out of engagement with the external teeth 7 of the conveyor belt 1 in this area of the free leg.

On the side of the transport leg 10, however, the magnet 28 is located at a distance from the smooth conveyor belt 17, the coupling teeth 12 being, however, in engagement with the teeth of the conveyor belt 1.

As can be seen from FIG. 1, a blocking device 33, which is, as a whole, referred to by reference numeral 33, is arranged in the area of the free leg 11 prior to the engagement curve 32 of the guide grooves 22 and 23.

This blocking device 33 serves to isolate hooks 9, which are to be positively recoupled to the external teeth 7 of the conveyor belt by means of their coupling teeth 12.

In the embodiment shown in the drawing, the blocking device 33 comprises a two-armed lever 34 having fixedly connected thereto an actuating arm 35. These parts of the blocking device are supported such that they are pivotable about stationary axis 36. Rolls 37 are rotatably supported at the ends of the two-armed lever 34.

An actuating rod 38 of an electromagnet 39, is articulated on the end of actuating arm 35.

By means of a control device (which is not shown, since it is generally known), the electromagnet 39 is controlled in such a way that it pivots the two-armed lever 34 at the necessary time intervals releasing one of the hooks 9, while the next hook is blocked again.

Due to the frictional engagement between the magnet 28 of the coupling member 24 of the hook 9 and the smooth conveyor belt 17, the released hook will be frictionally entrained and introduced in the positive-engagement portion of the conveyor belt in the manner described hereinbefore.

It follows that the thus achieved distances between the hooks introduced depend on the periods within which the blocking device 33 releases at intervals the hooks stored on the free leg.

The hooks stored on the free leg 11 are prevented from being moved by the smooth conveyor belt 17 by means of the blocking device 33, i.e. they slide on this smooth conveyor belt until one after the other is released. For this case, the drive disc 13 may also be constructed as a gear and the conveyor belt 17 as a toothed belt.

The attractive force of the permanent magnet 28 can in this case be chosen such that such sliding on the smooth conveyor belt 17 takes place without any noticeable wear, it being, however, guaranteed that the respective hook is entrained when the blocking effect is eliminated. The use of a smooth conveyor belt 17 consisting of plastic material will be advantageous in this case.

It is not absolutely necessary that the smooth conveyor belt 17 be underlaid with a steel strip 18.

It would also suffice if, as indicated in FIG. 2, the guide body 20 had arranged therein a steel rod 40 on the side of the free leg 11.

Thus in the embodiment described, when circulating, the hooks are forcibly guided in an endless, stationary guide path. In addition, the conveyor belts consist of a positive-engagement belt with outwardly projecting teeth and a laterally displaced smooth frictional-engagement belt, the hooks being pressed against and coupled to the positive-engagement belt in the area of the transport leg and being out of engagement with the positive-engagement belt, but pressed against the frictional-engagement belt, in the area of the free leg.

This positive engagement between the conveyor belt 1 and the hooks 9 can be achieved in a particularly simple manner by constructing the positive engagement belt as a toothed belt with outwardly protruding teeth, and, in addition, by providing each hook with a coupling member having coupling teeth in the area of the toothed belt. Further, the frictional engagement between the belt 17 and the hooks can be simply provided by placing a magnet in the hooks in the area of the smooth frictional-engagement belt, the frictional engagement belt being supported by a steel strip.

The measures permit the use of the area of the free leg 11 as a hook storage means where the blocking device 33 is arranged at the end of the free leg prior to the deflection wheel 2. It is thus possible to provide a stock of hooks in the area of the empty leg so that a sufficient number of hooks can be introduced in the area of the positive-engagement belt even if a comparatively small distance is needed between the hooks.

When the blocking device is constructed as an isolating means, the hooks can be introduced at certain time intervals with the control means, which deactivates and reactivates the blocking means at preselected time intervals.

In the area of the free leg 11, i.e. on the storage side of the conveyor belt, approximately 50 hooks can be stored in the case of a normal length of the apparatus so that it is also possible to adjust very small distances between the hooks. In the case of larger distances between the hooks, hooks would have to be removed or rather transferred to a separate storage path, when the storage capacity is approximately 50 hooks.

If minimum distances between the hooks are desired, the free leg 11 of the transport belt 1 can be connected to a separate storage path for additional hooks, said additional hooks being then removed from said storage path and stored on the side of the free leg according to requirements.

This will also be expedient in cases in which, in connection with a simplified structural design of the apparatus, the hooks 9 are not automatically coupled to the conveyor belt by a blocking device isolating the individual hooks, but are coupled by hand.

Such a simple apparatus largely corresponds to the apparatus described above, i.e. in the case of this apparatus, too, the hooks, when circulating, are forcibly guided in an endless, stationary guide path, the conveyor belt being constructed as a toothed belt with outwardly protruding teeth and each hook being provided with a coupling member having coupling teeth, which cooperate with the conveyor belt. In this case, however, each hook is constructed such that it is adapted to be removed from and reinserted into the endless, stationary guide path in the area of the free leg by hand. A recess in the guide path is provided in the area of the free leg of the conveyor belt for this purpose.

Figure 4:
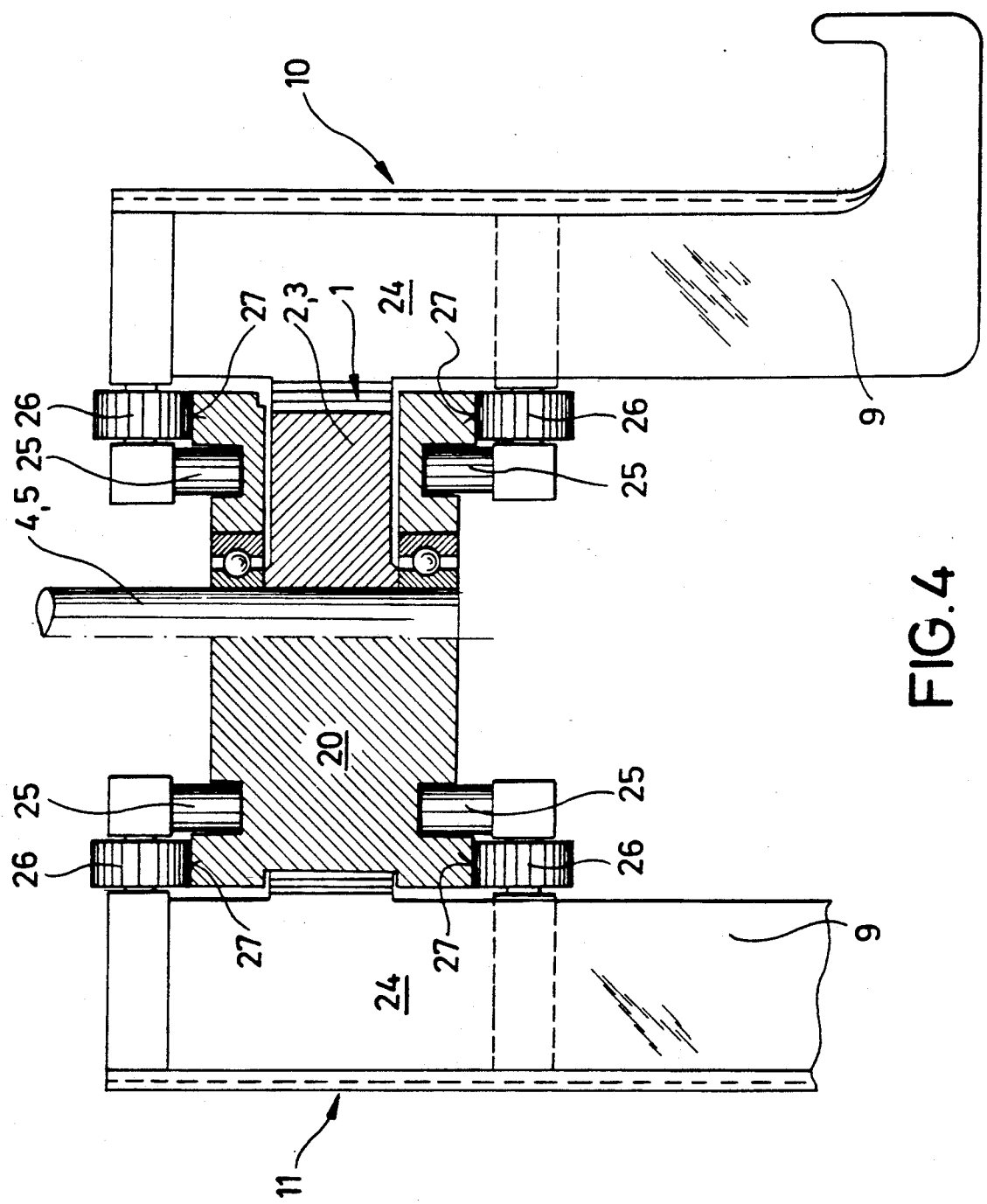
FIG. 4 shows a cross-section through a deflection wheel another embodiment of the apparatus having a simplified structural design.

FIG. 4 shows a cross-sectional view of such a simplified structural design of the apparatus.

In such an apparatus, the conveyor belt also is a toothed belt, which is provided with internal and external teeth and to which the coupling member 24 of each hook 9 remains coupled along the entire circulation path, i.e. also in the area of the free leg 11. Further at least one of the deflection wheels is constructed as a gear that engages with the internal teeth of the belt to drive the belt.

For attaching the hooks 9 to the conveyor belt at desired intervals, it is, for example, possible to provide each guide groove 22 and 23 with a laterally and outwardly open recess (not shown) in the area of the free leg 11 prior to the deflection wheel 2 so that, at this location, guidance of the guide pins 25 in the guide grooves 22 and 23 is not provided along a short area, thus permitting removal and reinsertion of the hooks.

This may, however, also be permitted by an arrangement in the which the guide pins 25 can be drawn back against the force of a spring and can thus be brought out of engagement with the guide grooves 22 and 23.

In cases in which the conveyor belt 1 is guided round deflection wheels, which are rotatably supported by means of upright shafts, it would also be possible to arrange two guide grooves side by side on the upper side of the guide body 20, said guide grooves being then engaged by two guide pins of each hook so that the hooks could be inserted from above in this case.

FIG. 4 shows the simplified apparatus in different cross-sectional views. On the left-hand side, the cross-section has been made between the deflection wheels, whereas the cross-section on the right-hand side extends through the center of a deflection wheel.

Figure 5:
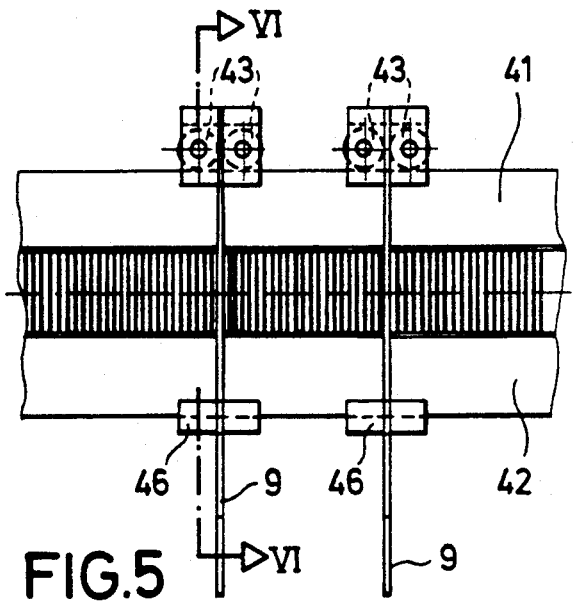
FIG. 5 shows a fragmentary side view of the apparatus having a different guide means for the hooks.
Figure 6:
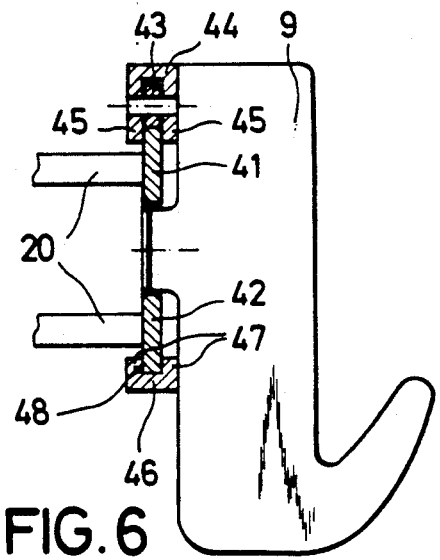
FIG. 6 shows a section along the line VI—VI of FIG. 5.

FIGS. 5 and 6 show a part of an apparatus in which the guide means for the hooks has a different structural design.

As can be seen from FIGS. 5 and 6, an upper upright flat section 41 and a lower upright flat section 42, which is in alignment with the upper one, are secured to the guide body 20. The upper flat section 41 has associated therewith a U-shaped section 44 whose opening faces downwards, said U-section 44 being attached to the hook 9 and straddling with its legs 45 the upper flat section 41.

Two travelling wheels 43, which are arranged one after the other, are rotatably supported in said U-section 44, said travelling wheels 43 resting on the upper side of the upper flat section 41.

Furthermore, the hook has secured thereto a lower U-shaped section 46 whose opening faces upwards, the leg ends 47 of said lower U-section straddling the lower area of the lower flat section 42.

The lower U-section 46 is provided with in an inner base, which is flat and which extends parallel to the underside of the lower flat section 42.

It follows that each hook 9 rests on the upper flat section 41 by means of the two travelling wheels 43. The respective hook is positively guided at the sides with the aid of the U-sections 44 and 46.

Moreover, the vertical position of each hook is also guaranteed when the hook is out of engagement with the teeth of the positive-engagement belt 1 in the area of the free leg 11, this being achieved by the cooperation between the underside of the lower flat section 42 and the inner base of the lower U-section 46.

Figure 7:
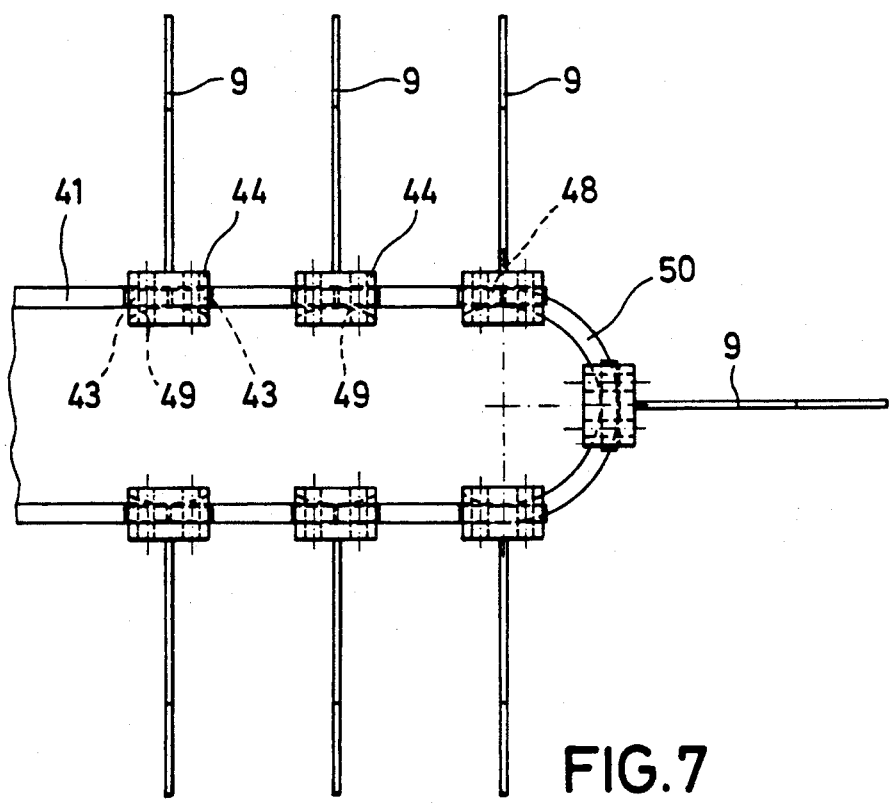
FIG. 7 shows a top view of the apparatus according to FIG. 5.

In order to enable the U-sections to follows the path of the flat sections 41 and 42 at the locations of deflections 50, the guide channel 48 defines an arc at the inner wall 49 thereof, the shape of said arc being adapted to the deflection (FIG. 7).

We claim:

1. Apparatus for transporting continuous sausage casing in the form of suspended loops comprising an endless conveyor belt circulating continuously around 2 deflection wheels, a first leg of travel of the belt between said wheels serving as a transport leg where the sausage loops are transported by the conveyor belt and a second leg of travel a free leg where the conveyor belt is free of the sausage loops, means for rotating at least one of said wheels to drive said belt, a plurality of reception hooks for holding the loops of casing, guide means for supporting and guiding said hooks for movement in a fixed endless path compatible with the path of travel of said conveyor belt, means for positively connecting said hooks to said belt in spaced relationship with one another for travel therewith through said transport leg and means for disengaging said positive connection at the end of the transport leg and for frictionally connecting said hooks to the conveyor belt for travel therewith through said free leg.

2. The apparatus of claim 1, wherein said conveyor belt comprises a first endless belt with outwardly projecting protrusions and a second endless belt laterally displaced therefrom having a smooth, frictional outer surface, and wherein the means for positively connecting the hooks to the belt in the transport leg includes cooperating structure on the hooks adapted to engage said protrusions on the first belt and means for pressing the hooks into engagement with the protrusions of the first belt for travel therewith through said transport leg and wherein the means for frictionally connecting the hooks in the free leg includes means for separating the hooks from engagement with the first belt and for frictionally engaging the hooks with said second belt for travel of the hooks therewith through said free leg.

3. The apparatus of claim 2 wherein said first belt has plurality of outwardly projecting teeth and the cooperating structure on the hooks are teeth adapted to engage with and be pulled along by said toothed belt in the transport leg and wherein the second belt includes a continuous steel strip and a magnet is provided in each of said hooks adjacent said second belt for frictionally engaging the hooks with said second belt in the free leg.

4. The apparatus of claim 1, 2 or 3 wherein the free leg serves as a hook storage area and in which a blocking means is located at the end of the free leg before the adjacent deflection wheel to retain a supply of hooks in said free leg and to release the hooks periodically for positive connection with said conveyor belt.

5. The apparatus of claim 4, wherein said blocking means includes control means for periodically deactivating at certain time intervals the blocking means to release said hooks for travel through the transport leg.

6. The apparatus of claim 5, wherein the blocking means includes a blocking arm for holding the hooks in said free leg and the control means includes an electromagnet whose activating rod is connected to said blocking arm.

7. The apparatus of claim 1 or 2 wherein the deflection wheels are secured to upright shafts and the guide means for supporting and guiding said hooks comprises a guide body having an upper endless guide groove and a lower endless guide groove in vertical alignment with the upper one, each of said hooks having two oppositely disposed guide pins disposed for sliding engagement with said guide grooves.

8. The apparatus of claim 7, including tracks on said guide body adjacent said guide grooves and guide rollers rotatably mounted on said hooks for travel along said tracks.

9. The apparatus of claim 2 or 3, wherein the deflection wheels are secured to upright shafts and the guide means for supporting and guiding said hooks comprises a guide body having an upper upright flat section and a lower upright flat section, which is in alignment with the upper one, a cooperating roller on each of said hooks resting on the top of the upper flat section, said roller being rotatably support in a downwardly open U-shaped section of said hook that straddles the upper flat section, the hooks also having an upwardly open U-shaped-section that straddles the lower flat section.

10. The apparatus of claim 9, including two rollers on each hook, that are aligned one after the other in their direction of travel.

11. The apparatus of claim 10, wherein each of the U-shaped sections defines a guide channel whose inner wall is in the shape of an arc to permit travel of said hooks around said deflection wheels.

12. The apparatus of claim 2, wherein the guide body has a circumferentially extending support groove for supporting the first belt and a circumferentially extending support groove for supporting the second belt.

13. The apparatus of claim 2 wherein each deflection wheel comprises a gear mounted on a first rotatable upright shaft, said first belt having internal teeth that mesh with said gears, and a disc mounted on a separate upright secondary shaft displaced relative to said first shafts in the direction of the free leg, said second belt being driven by said discs.

14. The apparatus of claim 13, wherein said discs have teeth that engage with internal teeth on the second belt.

15. The apparatus claim 14, wherein the means for rotating at least one of said wheels to drive said belts comprises means for rotating both gears and a driving pin in each gear engaging a recess in each disc to rotate its associated disc.

16. Apparatus for transporting continuous sausage casing in the form of suspended loops comprising an endless conveyor belt circulating around 2 deflection wheels, a first leg of travel of the belt between said wheels serving as a transport leg where the sausage loops are transported by the conveyor belt and a second leg of travel a free leg where the conveyor belt is free of the sausage loops, means for rotating at least one of said wheels to drive said belt, a plurality of reception hooks for holding the loops of casing, guide means for supporting and guiding said hooks for movement in a fixed endless path compatible with the path of travel of said conveyor belt, said conveyor belt being provided with a plurality of outwardly protruding teeth and each hook being provided with cooperating teeth adapted to engage with a tooth of the belt, means for permitting said hooks to be inserted into said guide path for positively connecting said hooks to said belt in spaced relationship to one another for travel through said transport leg and for permitting removal of said hooks from said guide path after they return to said free leg.

17. The apparatus of claim 16, wherein the deflection wheels are mounted on upright shaft and the guide means comprises a guide body having an upper guide groove and a lower guide grove in alignment with the upper groove, each of said hooks having two oppositely disposed guide pins for sliding engagement with a respective guide groove, and wherein the means permitting removal and insertion of the hooks comprises at least one outwardly directed recess in the upper and lower guide grooves, in the area of the free leg through which the guide pins of the hooks can pass.

18. The apparatus of claim 17, including tracks on the guide body adjacent the guide grooves and guide rollers rotatably mounted on said hooks for travel along said tracks.

19. The apparatus claim 1 or 16, wherein at least one of the deflection wheels comprises a gear, the conveyor belt having internal teeth, which mesh with said gear.

* * * * *